ically simple and substantially no more involved than those heretofore employed with welding equipment using capacitors as the welding arc power source.

United States Patent

[11] 3,562,485

| [72] | Inventor | Paul A. Glorioso |
| | | Amherst, Ohio |
| [21] | Appl No | 727,429 |
| [22] | Filed | May 8, 1968 |
| [45] | Patented | Feb. 9, 1971 |
| [73] | Assignee | TRW Inc. |
| | | Cleveland, Ohio |
| | | a corporation of Ohio. by mesne assignments |

[54] STUD WELDING CONTROL CIRCUIT
5 Claims, 4 Drawing Figs.
[52] U.S. Cl. .................................................. 219/98
[51] Int. Cl. .................................................. B23k 9/20
[50] Field of Search .................................... 219/98

[56] References Cited
UNITED STATES PATENTS
3,414,701 12/1968 Guettel ..................... 219/98

OTHER REFERENCES
Belke, R. E. et al., " General Electric Transistor Manual";
8/64; pg. 329 relied on Primary Examiner—J. V. Truhe
Assistant Examiner—R. E. O'Neill
Attorneys—Philip E. Parker, James R. O'Connor, John Todd, Wall & Houghton and Gordon Needleman ABSTRACT: A solid state control circuit and alternating current power sources for stud welding apparatus are provided. The power sources include three-phase power for the pilot arc and single-phase power for the welding arc. The controls for stud welding apparatus where such power sources are utilized would be expected to be quite complex and costly. The controls according to the instant invention, however, are relatively simple and substantially no more involved than those heretofore employed with welding equipment using capacitors as the welding arc power source.

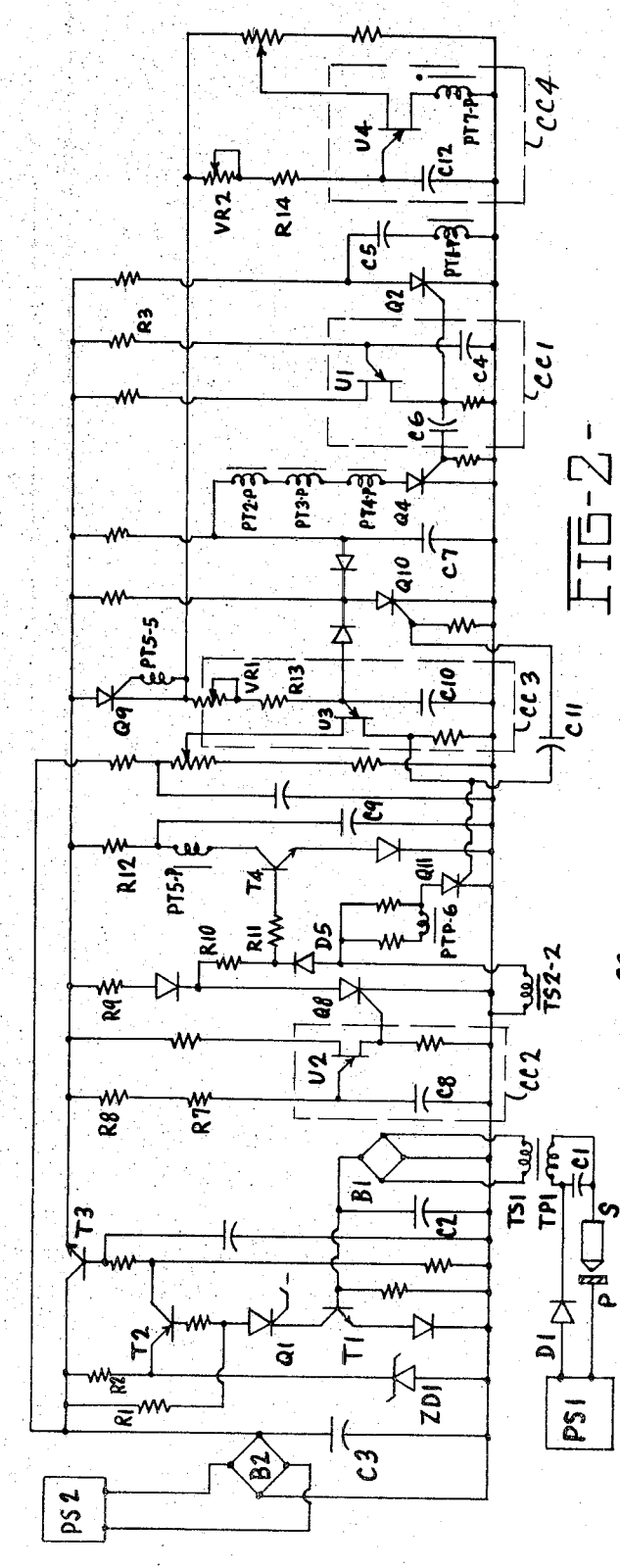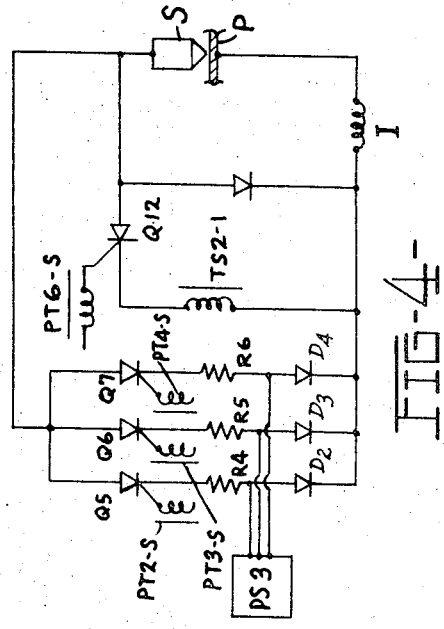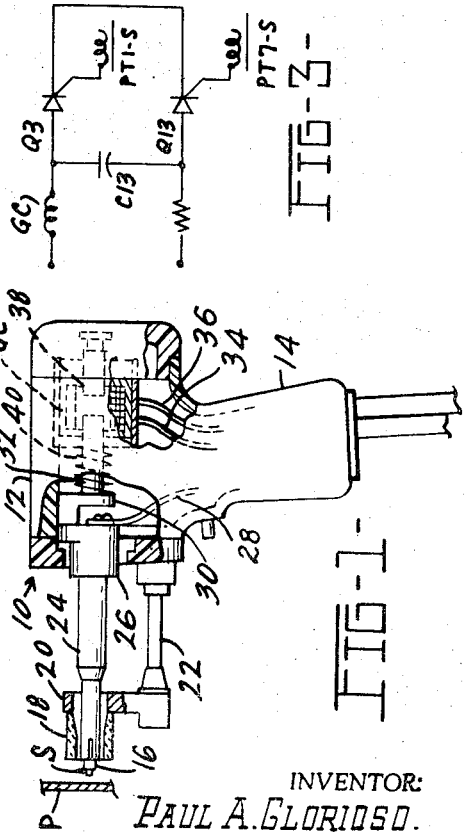
INVENTOR:
PAUL A. GLORIOSO.
BY
ATT'YS.

STUD WELDING CONTROL CIRCUIT

This invention relates to power sources and controls for stud welding apparatus.

Particularly for welding studs to relatively thin metal workpieces, it has been found to be advantageous to employ capacitors as the power source for the main welding arc, as disclosed in my U.S. Pat. No. 3,136,880. Rather than employing capacitors for the welding arc power source, alternating current can be employed, with phase control used to adjust the intensity of the welding arc. Controls for welding equipment employing this type of power source, however, tend to be quite expensive and complicated.

The present invention relates to controls for stud welding equipment with particular power sources employed, other than capacitors. A single-phase power source is employed for the main welding arc and in one form, by way of example, a three-phase power source is utilized for the pilot arc, which more effectively enables use of an extended pilot arc in the welding cycle, if desired. The extended pilot arc has been found to be particularly useful in stud welding where certain types of metal, such as galvanized steel, constitutes the workpiece to which the stud is to be welded. The controls for the welding cycle operate in timed relation with the welding arc power source and are substantially no more complicated than those heretofore employed in stud welding circuits when capacitors were used for the pilot arc and welding are power sources. Further, voltage compensation is included in the controls to vary the duration of the welding arc inversely to the voltage.

The relatively simplified controls according to the invention are made possible in part by timing the pilot arc in a manner such that it is not precisely controlled to a predetermined number of cycles, but is subject to some variation in duration. It has been found that such a variation can be tolerated without detrimental effect to the welding cycle, particularly when the extended pilot arc is employed.

It is, therefore, a principal object of the invention to provide solid state controls for stud welding equipment.

Another object of the invention is to provide simplified controls for stud welding with alternating current power employed for the main welding arc.

Other objects and advantages of the invention will be apparent from the following detailed description of a preferred embodiment thereof, reference being made to the accompanying drawings, in which:

FIG. 1 is a somewhat schematic view in longitudinal cross section of a stud welding tool which can be employed with the invention; and FIGS. 2—4 are diagrammatic views of the overall stud welding control circuit and power sources embodying the invention.

As shown in FIG. 1, a stud welding tool with which the circuit embodying the invention can be utilized is indicated at 10 and is of a conventional design. Briefly, the tool includes a main housing or body 12 having a handle 14 depending therefrom and a chuck 16 located at the forward end which holds a stud S when being welded to a workpiece P. A spark shield 18 is located around the chuck and stud and is positioned so that that the stud protrudes slightly beyond the shield prior to being pressed against the workpiece. This assures that the stud is in good electrical contact with the workpiece at the beginning of the welding cycle. The shield is held in position by a supporting foot 20 mounted on a pair of adjustable legs 22 extending from the body 12.

The stud chuck 16 is mounted on the end of a chuck leg 24 which is electrically connected by a cable clamp 26 to a main welding cable 28. A rear cable clamp part 30 has a solenoid core 32 extending rearwardly into a lifting and holding coil designated GC. The core is pulled into the coil GC when power is applied through suitable leads 34 and 36. An adjustable stop 38 at the rear of the coil determines the extent to which the core moves into the coil. This, in turn, determines the extent to which the stud is retracted from the workpiece during the welding cycle.

In the operation of the welding tool 10, the weldable end of the stud S is placed in contact with the workpiece P and pressed thereagainst, compressing the spring 40 slightly until the end of the spark shield 18 contacts the workpiece. When the trigger of the tool is pulled, the coil GC is energized and a potential is established between the workpiece and stud with the stud then withdrawn a predetermined distance, as determined by the stop 38, by the retraction of the core 32, with the pilot arc established during this time. After a period of time, the current to the gun coil GC is shut off, enabling the plunge spring 40 to move the chuck back toward the workpiece and cause the weldable end of the stud S to contact the workpiece. Before the engagement of the stud and the workpiece, a main welding arc is established therebetween. The timing of the main welding arc depends on the speed of the plunge stroke and in addition on such factors as the size of the studs being welded which determines the length of the welding arc. Larger studs generally require a main welding arc of longer duration than smaller ones. The main welding arc preferably is maintained substantially until the stud plunges against the workpiece to assure that metal melted by the main welding arc will not solidify prior to contact.

An alternating current, and specifically a three-phase rectified power source, can be employed for the pilot arc in the welding circuitry although other power sources, preferably independent of the welding arc power source, can be used. Rectified alternating current, specifically single phase, constitutes the power source for the welding arc. Although ordinarily complex control circuitry would be required when such power sources are used, relatively simplified timing controls have been achieved according to the present invention for sequencing the stud lift, pilot arc, stud plunge, and main welding arc. The duration of the pilot arc can vary up to one cycle of alternating current, but this is not a material variation, particularly with an extended pilot arc, as might be used in welding studs to galvanized metal, for example, which may persist for as long as 45 to 200 milliseconds. The new controls also enable the length of the welding arc to be extended and adjustably controlled.

Referring to FIG. 2, power from a low voltage, alternating current source designated PS1 is supplied to a primary TP1 of a first transformer after receiving half-wave rectification through a diode D1 and being tuned by a capacitor C1. The stud and workpiece are also in this circuit to prevent initiation of a welding cycle unless the stud is in contact with the workpiece. The diode D1 and the capacitor C1 isolate the power source from the welding circuit. Low voltage, 26 volt, alternating current can be employed for safety purposes, by way of example. The output of a secondary TS1 of the first transformer is connected with full wave bridge B1, is filtered by a capacitor C2, and is supplied to the base of a first transistor T1 which is thereby turned on and remains on until the welding tool is removed from the welded stud.

The welding tool trigger can be coupled to an angle control circuit as shown in my copending application Ser. No. 517,293 now U.S. Pat. No. 3,392,257. With the stud perpendicular to and in contact with the workpiece, when the trigger is pulled, a pulse is supplied to a silicon controlled rectifier Q1 to render it conducting. A circuit is thereby completed through the transistor T1, the rectifier Q1, and a holding resistor R1. Otherwise, a pulse is simply applied to the gate of the rectifier Q1 when the trigger is pulled.

A second low voltage power supply PS2 which is in phase with the source PS1, both originating from line current, is connected through a second full-wave bridge B2 and a filter C3, with part of the current applied from the filter C1 through a resistor R2 and a zener diode ZD1 to provide a reference voltage. With the rectifier Q1 on, a transistor T2 is turned on and couples the reference voltage of the zener diode ZD1 to the base of a regulator transistor T3 which provides a constant voltage supply proportional to the reference voltage.

The output of the transistor T3 is applied to several control circuits which control the welding cycle, including stud lift, pilot arc, welding arc, and stud plunge. A first control circuit CC1 initiates the lifting of the stud and the pilot arc. A second control circuit designated CC2 in combination with a third control circuit CC3 controls the duration of the pilot arc and also initiates the main welding arc. A fourth control circuit CC4, operated simultaneously with the third circuit CC3, initiates the stud plunge.

The first control circuit CC1, connected to the output of the transistor T3, includes a unijunction transistor U1, a capacitor C4, and a resistor R3. For lifting the stud, when the capacitor C4 reaches the firing voltage of the transistor U1 for the first time, it keys a silicon controlled rectifier Q2 which causes a capacitor C5 to discharge into a primary PT1-P of a first pulse transformer. This, through a secondary PT1-S (FIG. 3), fires a silicon controlled rectifier Q3 which completes a circuit through the gun coil GC of the welding tool and causes the core 32 to be pulled into the coil and lift the stud from the workpiece.

To initiate the pilot arc, a capacitor C6 also couples pulses from the unijunction transistor or relaxation oscillator U1 to a silicon controlled rectifier Q4. When the rectifier Q4 is fired, it enables a capacitor C7 to discharge through primaries PT2-P, PT3-P, and PT4-P of three additional pulse transformers. The three pulse transformer primaries in circuit with the rectifier Q4 and the capacitor C7 cause the rectifier Q4 to oscillate at the excited frequency so that the primaries are continually pulsed. The primaries PT2-P, PT3-P, PT4-P, the capacitor C7 and the control rectifier or switchable unidirectional device Q4 provide a blocking oscillator. Secondaries PT2-S, PT3-S, and PT4-S in the welding circuit thereby fire silicon controlled rectifiers Q5, Q6, and Q7 which complete a circuit for the pilot arc power through resistors R4, R5, and R6. This circuit includes a main inductance I, the workpiece P, the stud S, diodes D2, D3, and D4, and a source of three-phase power designated PS3 which is in phase with the line current and power sources PS1 and PS2. At this point, the stud is being retracted or lifted from the workpiece and the pilot arc initiated and maintained between the stud and the workpiece. With the independent power source PS3, the pilot arc can be maintained for as long as desired, and particularly with certain workpieces such as galvanized metal, an extended pilot arc in the order of 45 to 200 milliseconds is desirable. Other sources for the pilot arc can be used, if they are independent of the welding arc power.

The second timing control circuit CC2, which controls operation of the circuit CC3 to control the duration of the pilot arc, includes a capacitor C8, a free running unijunction transistor U2, a resistor R7, and a calibrating resistor R8, which can be variable, if desired. The resistor R8 controls the time required for the capacitor C8 to reach the firing voltage of the unijunction transistor U2. First, however, to the right of the circuit CC2, is located a transistor T4 which is connected with an alternating current power source represented by a second secondary TS2-2 of a second transformer which also constitutes the welding arc power source, the two thereby being in phase. The transistor T4 is held in a saturated or fully on condition through resistors R9, R10, and R11. This condition of the transistor T4 causes a capacitor C9 to be held discharged through a primary PT5-P of a fifth pulse transformer. Thus, the fifth pulse transformer is not pulsed as long as the transistor T4 remains on. The reference voltage from the secondary TS2-2 is in phase with the welding arc power and is applied to the base of the transistor T4 through a diode D5 and the resistor R11. This has no effect on the transistor T4, however, as long as the transistor is already on. When the unijunction transistor U2 in the second control circuit TC2 fires, it turns on a silicon controlled rectifier Q8. The rectifier Q8 removes the saturation voltage from the transistor T4, if the reference voltage is zero or negative. If this voltage is positive, however, the transistor T4 will not turn off until the voltage reaches zero or negative. Thus, the time required for the transistor T4 to be turned off varies up to a cycle and the pilot arc time can similarly vary up to one cycle (or plus-or-minus one-half cycle from a central reference point). However, with the extended pilot arc, this variation is of substantially no significance. The transistor T4, the primary PT5-P, the resistors R9, R10, R11, the capacitor C9 and the secondary TS2-2 form a synchronizing circuit.

When the transistor T4 is no longer saturated and is off, the capacitor C9 begins to charge through a resistor R12. When the reference voltage approaches a positive condition again, the transistor T4 is on again. At this time, the capacitor C9 discharges through the primary PT5-P which is then repeatedly pulsed in accordance with the line frequency and the welding arc power, although only the first pulse is significant. The primary pulses a secondary PT5-S which fires a silicon controlled rectifier Q9 and connects both the third control circuit CC3 and the fourth control circuit CC4 with the power source established through the transistor T3. The third and fourth timing control circuits are thus energized in synchronization with the welding arc power supply to make phase control of the welding arc possible.

The third control circuit includes a unijunction transistor U3, a capacitor C10, a resistor R13, and a variable resistor VR1. The unijunction transistor U3 is coupled through a capacitor C11 to the gate of a silicon controlled rectifier Q10 which is fired when the transistor U3 conducts. The rectifier Q10 then shorts out the capacitor C7 which stops oscillation of the rectifier Q4 and stops the gate pulses to the secondaries PT2-S, PT3-S, and PT4-S.

When the unijunction transistor U3 in the circuit CC3 is fired, it also pulses a silicon controlled rectifier Q11 which pulses a primary PT6-P of a sixth pulse transformer. This applies a gate voltage through a secondary PT6-S to a main silicon controlled rectifier Q12 in the main welding circuit. The main welding circuit is completed through the first secondary TS2-1 of the second transformer to establish the main welding arc between the stud and the workpiece. With the transistor U3 connected with the line alternating current PS2, if the voltage drops, the transistor U3 will conduct early and cause the welding arc to be initiated earlier. Thus, if the voltage drops, the welding arc will automatically persist longer. Similarly, if the line voltage is higher, the transistor will conduct later and the welding arc will be shorter. Consequently, the use of the alternating current power with the control circuitry automatically achieves voltage compensation for the welding arc.

When the rectifier Q9 initiates operation of the control circuit CC3, it also supplies power to the control circuit CC4 which initiates the plunge stroke of the stud. This circuit includes a unijunction transistor U4, a capacitor C12, a resistor R14, and a variable resistor VR2. When the unijunction transistor U4 fires, it pulses a primary PT7-P of a seventh pulse transformer which, through a secondary PT7-S (FIG. 3), turns on a silicon controlled rectifier Q13. The latter, by commutation, turns off the rectifier Q3 and thereby deenergizes the gun coil GC. The return spring 40 of the welding tool then causes the stud to begin its plunge stroke toward the workpiece with the control circuit CC3 initiating the welding arc prior to the stud reaching the workpiece. In at least most instances, the control circuit CC4 is timed to deenergize the gun coil and initiate the plunge stroke prior to the circuit CC3 initiating the welding arc although the welding arc can be initiated first, if desirable.

Because of the synchronizing of the circuit CC3 with the welding arc power and the timing of the unijunction transistor U3, the rectifier Q12 is fired during a positive cycle, the point in the positive cycle depending on the variable resistor VR1, and turns off when the welding voltage drops to zero. This phase control of the welding arc thereby normally lasts for a period less than one-half cycle. However, through the inductance I and a "free-running" diode D6, the welding arc will be prolonged.

From the above it will be seen that the control circuit according to the invention employs an extended power pilot arc with a rectified alternating current source for the welding arc. At the same time, however, the phase control and timing for the overall welding cycle is comparatively simple and relatively maintenance free.

SUMMARY OF OPERATION

With the stud in proper position against the workpiece and the trigger pulled, a power supply is established through the transistor T3. The control circuit CC1 then causes the gun coil GC to be energized through the rectifier Q3. This is accomplished by firing the rectifier Q2 to pulse the first pulse transformer. Substantially simultaneously, the control circuit CC1 establishes the pilot arc between the stud and the workpiece by means of the rectifier Q4. The pilot arc continues through the rectifiers Q5, Q6, and Q7 by the oscillations set up in the circuit containing rectifier Q4.

The second control circuit CC2 is energized at the same time as the circuit CC1 and, when the unijunction transistor U2 is fired, it simultaneously energizes the control circuits CC3 and CC4 in synchronization or phase with the welding arc power and line frequency by means of the secondary TS2-2 and the transistor T4. These circuits will not be energized at a precise time, but will vary up to one cycle, depending upon the point in the cycle of the welding arc power source at which the rectifier Q8 is fired to remove the saturation voltage from the transistor T4. When the transistor T4 is turned off and on again, the fifth pulse transformer is pulsed to fire the rectifier Q9 and energize both of the control circuits CC3 and CC4.

The third control circuit initiates the welding arc according to the variable resistor VR1, with the length of time between initiation of the pilot arc and initiation of the welding arc equaling the variable length of time between energization of the rectifier Q1 and energization of the circuit CC3 plus the delay determined by the variable resistor VR1.

The fourth control circuit, operated at the same time as the third control circuit, initiates the plunge of the stud by keying the rectifier Q13.

From the above, it will be seen that since the control circuits CC3 and CC4 are operated simultaneously, termination of the pilot arc, initiation of the welding arc, and initiation of the plunge stroke of the stud will occur at predetermined relative times. Hence, only the length of the pilot arc can vary, with this variation being a maximum of one cycle of the welding arc power source. The duration of the pilot arc thereby also is independent of the pilot arc power source.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A stud welding apparatus comprising, in combination a stud welding tool including a chuck for holding a stud, a solenoid for retracting the chuck, means for plunging the chuck towards a workpiece, a power supply for the welding arc deriving from an alternating current source, a power supply for a pilot arc, and a power supply for a control circuit, the control circuit including a transistor doubling as a switch and voltage regulator, first means for energizing the solenoid and for initiating a pilot arc between a stud and the workpiece, timing control means for controlling the duration of the pilot arc and for initiating a welding arc in timed relation with the welding arc power and control means, for initiating the plunge stroke of the stud, pilot arc being unsynchronized.

2. A stud welding apparatus as set forth in claim 1 wherein the pilot arc circuitry has a pilot arc driving circuit comprising a blocking oscillator circuit including the inductance of a pulse coupling transformer primary, a switchable unidirectional device and a capacitor in parallel with the inductance through the switchable unidirectional device.

3. A stud welding apparatus as set forth in claim 1 wherein the pilot arc drive circuit is rendered operative by pulses from a unijunction relaxation oscillator.

4. A stud welding apparatus as set forth in claim 1 wherein the control circuit includes a free running unijunction timing circuit to control the duration of the pilot arc.

5. A stud welding apparatus as set forth in claim 1 wherein the control circuit includes a synchronizing circuit to produce a pulse to synchronize turn off of the solenoid and initiation of flow of welding current after a predetermined unsynchronized time period comprising a transistor connected in series with a pulse transformer.

UNITED STATES PATENT OFFICE
CERTIFICATE OF CORRECTION

Patent No. 3,562,485    Dated February 9, 1971

Inventor(s) Paul A. Glorioso

It is certified that error appears in the above-identified patent and that said Letters Patent are hereby corrected as shown below:

Column 1, line 59, delete "that" (first occurrence).

Column 6, line 21, delete the comma.

Signed and sealed this 8th day of October 1974.

(SEAL)
Attest:

McCOY M. GIBSON JR.            C. MARSHALL DANN
Attesting Officer              Commissioner of Patents